United States Patent [19]

Lee

[11] Patent Number: 5,598,216
[45] Date of Patent: Jan. 28, 1997

[54] METHOD AND APPARATUS FOR ENCODING/DECODING A VIDEO SIGNAL

[75] Inventor: Min-Sub Lee, Seoul, Rep. of Korea

[73] Assignee: Daewoo Electronics Co., Ltd, Seoul, Rep. of Korea

[21] Appl. No.: 434,808

[22] Filed: May 4, 1995

[30] Foreign Application Priority Data

Mar. 20, 1995 [KR] Rep. of Korea .................... 95-5868

[51] Int. Cl.⁶ ............................................. H04N 7/32
[52] U.S. Cl. .................... 348/416; 348/699; 382/241
[58] Field of Search ................................. 348/416, 699, 348/700, 415, 409, 402, 401, 400, 390, 384; 382/236, 238, 241

[56] References Cited

U.S. PATENT DOCUMENTS

4,992,870  2/1991  Samad ..................................... 348/441
5,295,201  3/1994  Yokohama ........................... 382/236

Primary Examiner—Tommy P. Chin
Assistant Examiner—Bryan Tung
Attorney, Agent, or Firm—Anderson, Kill, Olick P.C.

[57] ABSTRACT

A video signal encoding apparatus determines quasi-feature points on the current frame based on selected feature points on the previous frame. A predicted current frame is obtained based on a number of triangle regions formed by the quasi-feature points. After determining a frame difference signal by subtracting the predicted current frame signal from the current frame signal, a plurality of processing regions are selected from the frame difference signal based on the magnitude of average pixel difference values corresponding to the triangle regions. Only the selected processing regions are then encoded for transmission to thereby reduce a transmission rate. A video signal decoding apparatus comprises corresponding circuits for decoding the selectively encoded video signal.

10 Claims, 9 Drawing Sheets

FEATURE POINT

FIG. 4B

FEATURE POINT

FIG.5A

FEATURE POINT

FIG.5B

FEATURE POINT

METHOD AND APPARATUS FOR ENCODING/DECODING A VIDEO SIGNAL

FIELD OF THE INVENTION

The present invention relates to a method and apparatus for encoding/decoding a video signal; and, more particularly, to an encoding method and apparatus which is capable of reducing a transmission rate by selectively encoding a video signal and also to a decoding apparatus corresponding thereto.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique together with a statistical coding technique, is known to be most effect ire.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and its previous frame, and predicting the current frame according to the motion flow of the object to produce an error signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

The two-dimensional DCT, which reduces or makes use of spatial redundancies between image data, converts a block of digital image data, for example, a block of 8×8 pixels, into a set of transform coefficient data. This technique is described in Chen and Pratt, "Scene Adaptive Coder", *IEEE Transactions on Communications*, COM-32, No. 3(March 1984). By processing such transform coefficient data with a quantizer, zigzag scanning, and VLC, the amount of data to be transmitted can be effectively compressed.

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been two basic approaches to estimate the displacement of pixels of an object: one is a block-by-block estimation and the other is a pixel-by-pixel approach.

In the block-by-block motion estimation, a block in a current frame is compared with blocks in its previous frame until a best match is determined. From this, an interframe displacement vector (representing how much the block of pixels has moved between frames) for the whole block can be estimated for the current frame being transmitted. However, in the block-by-block motion estimation, poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined for each and every pixel, it is virtually impossible to transmit all of the motion vectors to a receiver.

One of the techniques introduced to ameliorate the problem of dealing with the surplus or superfluous transmission data resulting from the pixel-by-pixel approach is a feature point-based motion estimation method.

In the feature point-based motion estimation technique, motion vectors for a set of selected pixels, i.e., feature points, are transmitted to a receiver, wherein the feature points are defined as pixels of a previous frame or a current frame capable of representing a motion of an object so that motion vectors for pixels of a current frame can be recovered or approximated from those of the feature points in the receiver. In an encoder which adopts the motion estimation based on feature points, disclosed in a commonly owned copending application, U.S. Ser. No. 08/367,520, entitled "Method and Apparatus for Encoding a Video Signal Using Pixel-by-Pixel Motion Estimation", a number of feature points are first selected from all of the pixels contained in the previous frame. Then, motion vectors for the selected feature points are determined, wherein each of the motion vectors represents a spatial displacement between one feature point in the previous frame and a corresponding matching point, i.e., a most similar pixel, in the current frame. Specifically, the matching point for each of the feature points is searched in a search region within the current frame, wherein the search region is defined as a region of a predetermined area which encompasses the position of the corresponding feature point.

Even though it is possible to greatly reduce the amount of data to be transmitted through the use of the aforementioned feature point-based motion estimation technique, it is still required to further reduce the volume of data in order to successfully implement the technique in a low-bit rate codec system having, e.g., 64 kb/s transmission channel bandwidth.

SUMMARY OF THE INVENTION

It is, therefore, a primary object of the invention to provide an improved video signal encoding and decoding apparatus for use with a low-bit rate video codec system, which is capable of reducing a transmission rate by selectively encoding an image data obtained through the use of the feature point-based motion estimation technique.

In accordance with the present invention, there is provided a method for reducing a transmission rate of a digital video signal/ said digital video signal having a plurality of frames including a current frame and its previous frame/by selectively encoding the current frame, comprising the steps of: (a) selecting a multiplicity of pixels in the previous frame as feature points and detecting motion vectors for the feature points between the current frame and the previous frame, said feature points representing motions of objects in the digital video signal; (b) determining a multiplicity of quasi-feature points on the current frame based on the feature points and the motion vectors thereof; (c) defining non-overlapping polygons formed by line sediments connecting the quasi-feature points; (d) determining a predicted position on the previous frame for each pixel contained in each polygon of the current frame based on positional relationships between the quasi-feature points forming said each polygon and their corresponding feature points; (e) providing a predicted pixel value for said each pixel based on the predicted position; (f) generating a differential pixel value for said each pixel by subtracting the predicted pixel value from the pixel value of said each pixel; (g) calculating an error value for each polygon by averaging the differential pixel values corresponding thereto; (h) selecting, as processing regions, a multiple number of polygons in a descending order of their magnitude beginning from the maximum error value, and generating position information for the selected processing regions; and (i) encoding the differential pixel values for each of the processing regions.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
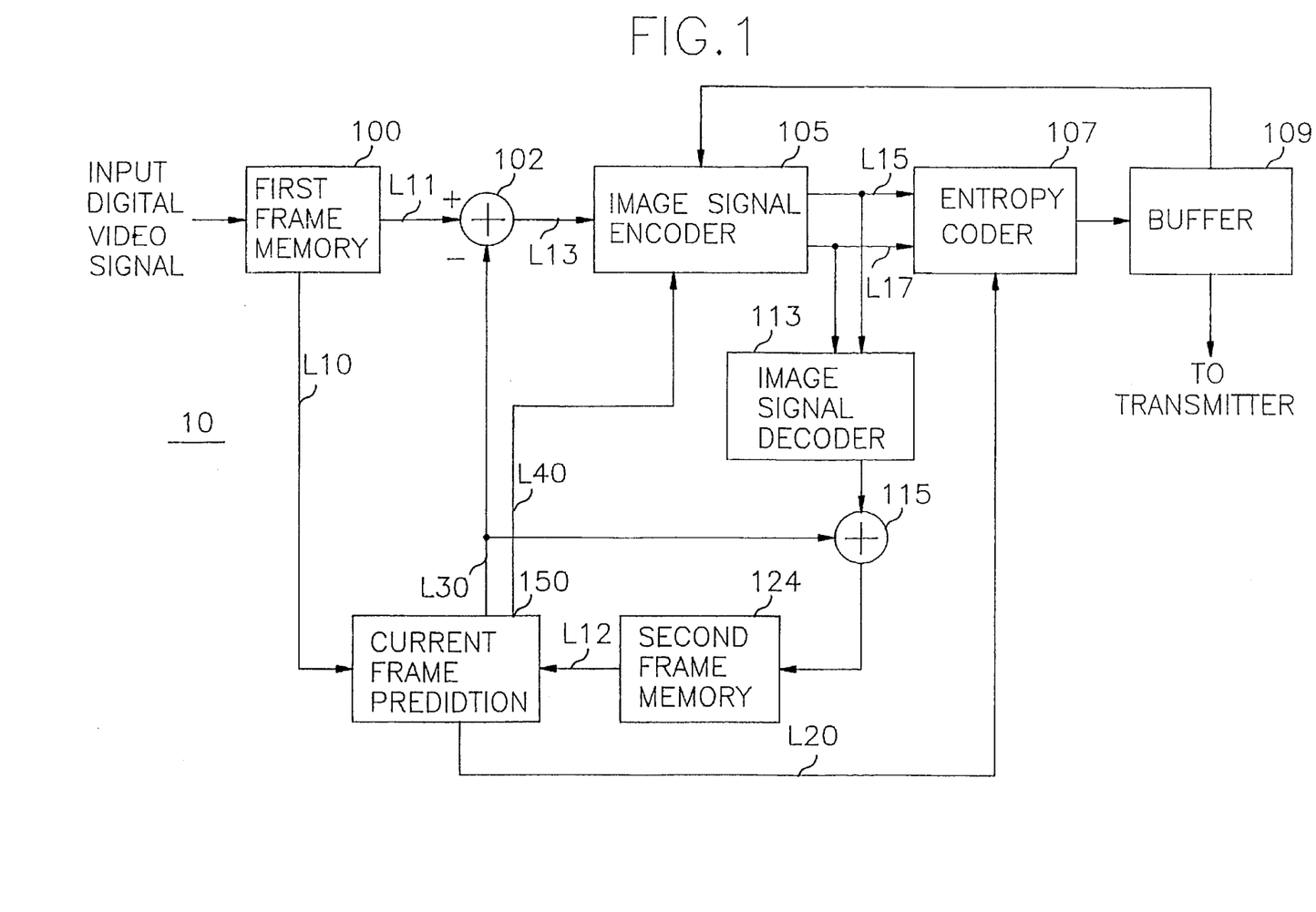
FIG. 1 is a block diagram of a video signal encoding apparatus in accordance with the present invention.

Referring to FIG. 1, there is shown a block diagram of a video signal encoding apparatus 10 in accordance with the present invention. An input digital video signal is stored as a current frame signal in a first frame memory 100 which is connected to a subtractor 102 through a line L11 and to a current frame prediction block 150 through a line L10.

At the current frame prediction block 150, a current frame signal on the line L10 retrieved from the first frame memory 100 and a reconstructed previous frame signal on the line L12 from a second frame memory 124 are processed to predict the current frame on a pixel-by-pixel basis to generate a predicted current frame signal onto a line L30, a set of motion vectors for feature points onto a line L20 and triangle information onto a line L40 which represents the positions of the triangles employed to generate the predicted current frame signal. Details of the current frame prediction block 150 will be described with reference to FIGS. 2 and 6.

Figure 7:
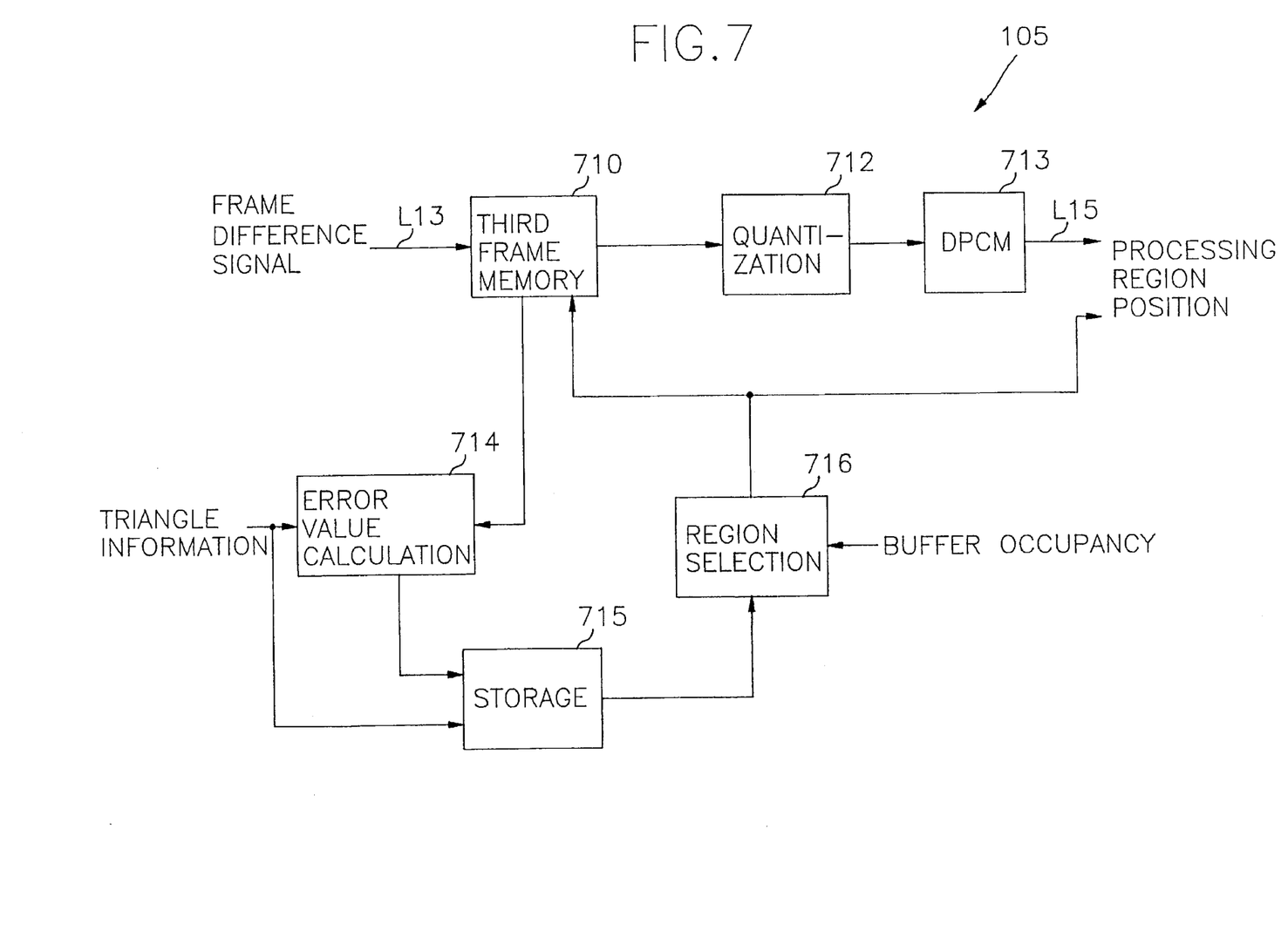
FIG. 7 represents a detailed block diagram of the image signal encoder shown in FIG. 1.
Figure 8A:
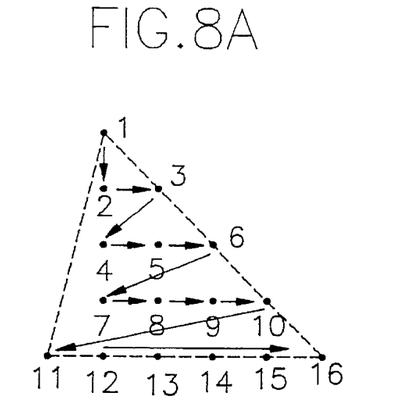
FIGS. 8A and 8B set forth two exemplary sequences for obtaining DPCM data from differential pixel values in a processing region.
Figure 8B:
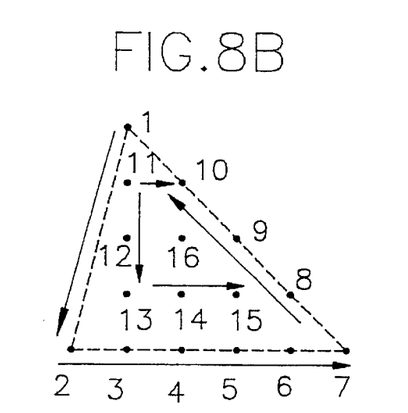

The predicted current frame signal on the line L30 is subtracted from a current frame signal on a line L11 at the subtractor 102, and the resultant data, i.e., frame difference signal denoting differential pixel values between the current frame and the predicted current frame, is dispatched to an image signal encoder 105 of the present invention, wherein a frame difference signal is processed to determine a multiplicity of processing regions such that an error function, e.g., MSE(Mean Square Error) or MAE(Mean Absolute Error), for each of the selected processing regions is larger than those of the non-processing regions; and the differential pixel values included in the processing regions are encoded into DPCM(differential pulse code modulation) data on a region-by-region basis(Details of the image signal encoder 105 will be described hereinafter with reference to FIGS. 7, 8A and 8B).

Thereafter, the DPCM data on a line L15 and the data on the processing region positions on a line L17 are transmitted to a entropy coder 107 and an image signal decoder 113. At the entropy coder 107, the DPCM data and the processing region positions are coded together with the motion vectors supplied through the line L20 by using a statistical coding scheme, for example, a combination of run length and variable length coding techniques, and then transmitted at a constant transmission rate through a buffer 109 to a transmitter(not shown). At the image signal decoder 113, the DPCM data is converted back into a reconstructed frame difference signal(Details of the image signal decoder 113 will be described with reference to FIG. 9).

The reconstructed frame difference signal from the image signal decoder 113 and the predicted current frame signal on the line L30 from the current frame prediction block 150 are combined at an adder 115 to provide a reconstructed current frame signal to be written onto the second frame memory 124. Reconstruction of the frame difference signal is required in order for the encoder to monitor the behavior of the decoder in a receiver to thereby prevent the current frame signal reconstructed at the encoder from diverging from that of the decoder in the receiver.

Figure 2:
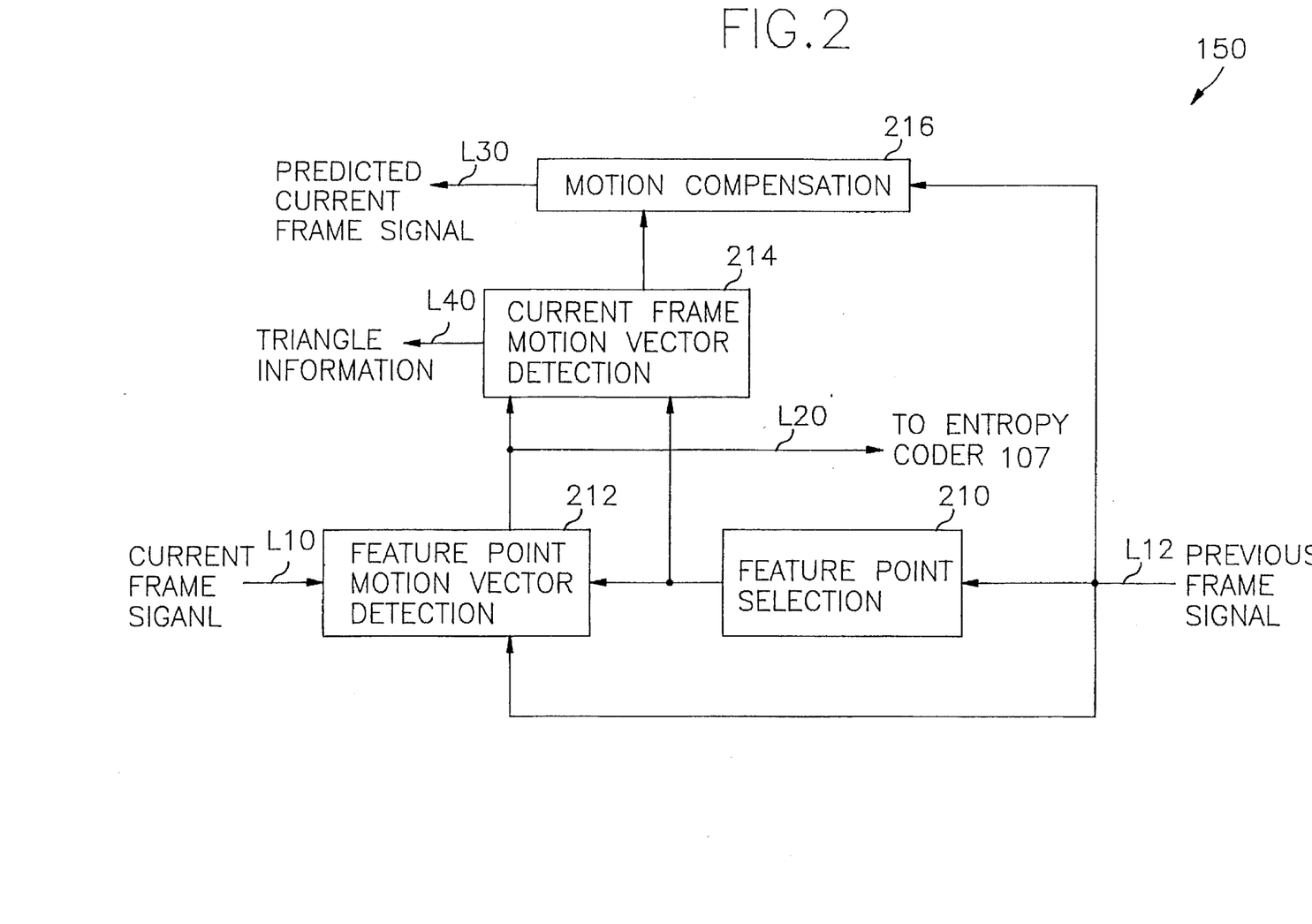
FIG. 2 shows a detailed block diagram of the current frame prediction block of FIG. 1.

Referring now to FIG. 2, the previous frame signal on the line L12 from the second frame memory 124 is inputted to a feature point selection block 210, a feature point motion vector detection block 212 and a motion compensation block 216.

Figure 3:
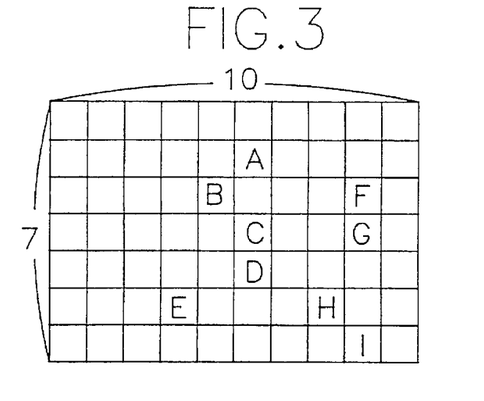
FIG. 3 describes an exemplary frame to define feature points.

At the feature point selection block 210, a number of feature points are selected among the pixels contained in the previous frame. The feature points are defined as pixels which are capable of representing the motions of objects in the frame. Referring to FIG. 3, there is shown an exemplary frame of 10×7 pixels. If a moving object exists around the center of the frame and the motion of the moving object is successfully represented by a set of pixels "A" to "I", these pixels are selected as the feature points of the frame.

Figure 4A:
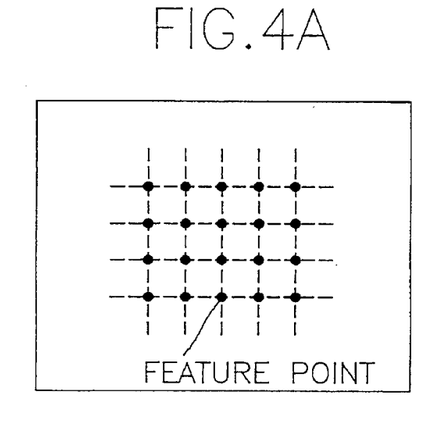
FIGS. 4A and 4B illustrate two types of grids to select feature points.
Figure 4B:
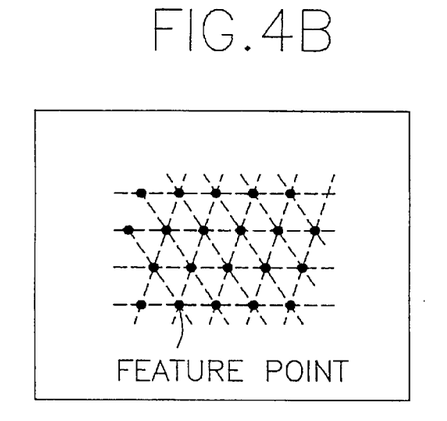

In a preferred embodiment of the present invention, the feature points are determined by a grid technique employing various types of grids, e.g., a rectangular grid or a hexagonal grid shown in FIGS. 4A and 4B, respectively. As shown in FIGS. 4A and 4B, the feature points are located at the nodes of the grids.

Figure 5A:
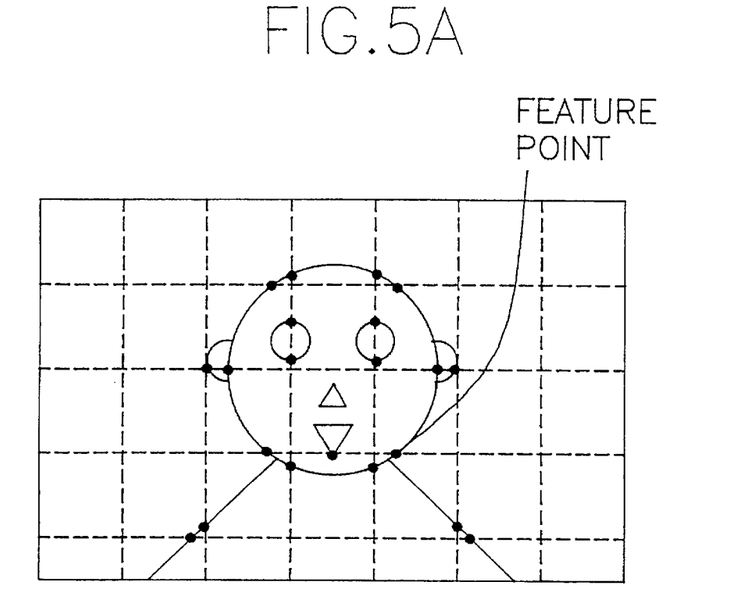
FIGS. 5A and 5B depict a technique to select feature points through the use of grids and edges of objects.
Figure 5B:
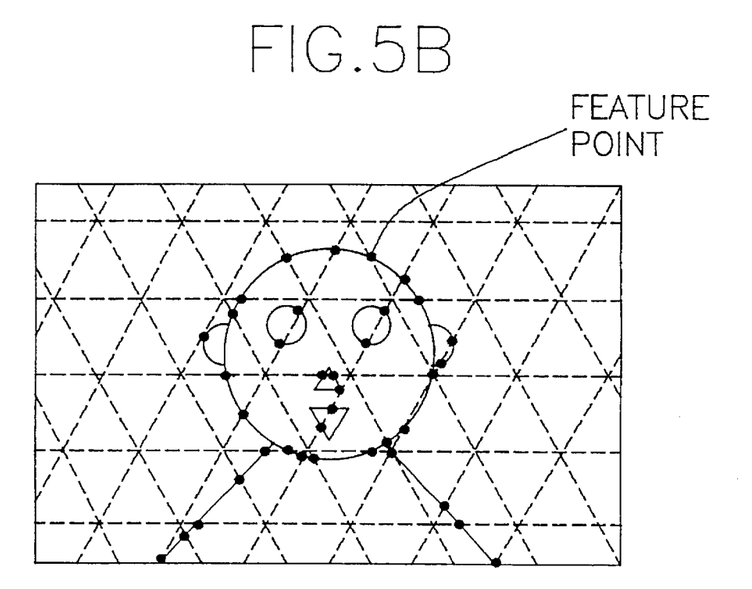

In another preferred embodiment of the invention, an edge detection technique is employed together with the above described grid technique as shown in FIGS. 5A and 5B. In this scheme, intersection points of the grid and edges of the objects are selected as feature points.

Referring back to FIG. 2, position data of the selected feature points from the feature point selection block 210 is inputted to a feature point motion vector detection block 212 and a current frame motion vector detection block 214.

At the feature point motion vector detection block 212, a first set of motion vectors for the selected feature points is detected based on the current frame signal on the line L10 and the selected feature points. Each of the motion vectors of the first set represents a spatial displacement between a feature point in the previous frame and a most similar pixel thereto in the current frame. There are numerous processing algorithms available for use to detect the motion vectors on a pixel-by-pixel basis. In the preferred embodiments of the invention, there is used a block matching algorithm: that is, when the position data of a feature point is received from the feature point selection block 210, a feature point block, e.g., 5×5 pixels of the previous frame, having the feature point at the center thereof is retrieved via the line L12 from the second frame memory 124 shown in FIG. 1. Thereafter, a motion vector for the feature point block is determined after a similarity calculation by using an error function, e.g., MAE(mean absolute error) or MSE(mean square error), between the feature point block and each of a plurality of equal-sized candidate blocks included in a generally larger search region of P×Q, e.g., 10×10, pixels of the current frame retrieved from the first frame memory 100 shown in FIG. 1, wherein the motion vector is a displacement between the feature point blocks and a candidate block which yields a minimum error function.

The determined motion vector is then set as the motion vector of the feature point. The motion vectors for the feature points are applied, as the first set of motion vectors, to the current frame motion vector detection block 214 and the entropy coder 107 shown in FIG. 1 through the line L20.

At the current frame motion vector detection block 214, a second set of motion vectors for all of the pixels in the current frame is determined through the use of the first set of motion vectors from the feature point motion vector detection block 212 and the position data of the feature points from the feature point selection block 210. In order to determine the second set of motion vectors, quasi-feature points(QP's) are determined first, wherein the QP's represent the pixels of the current frame shifted from the feature points of the previous frame by the first set of motion vectors. After determining the QP's, a plurality of non-overlapping polygons, e.g., triangles, are defined by connecting, e.g., three neighboring QP's as shown in FIG. 6A.

In the preferred embodiment of the invention, formation of unique triangles formed from a set of arbitrarily distributed QP's is obtained by adding a new line segment between a QP and its nearest QP, starting from a QP of the highest priority. For instance, if seven QP's, e.g., QP1 to QP7, are randomly distributed in a frame of 6×5 pixels as shown in FIG. 6A, formation of line segments for the QP's is performed in a sequence of QP1 to QP7, wherein the numerials in the parentheses represent the x and y coordinates of a QP measured from the origin, e.g., left-top corner pixel P1, of the frame. That is, priority is given to the QP's in an ascending order of their y values. If more than one QP's have a same y value priority is given to the QP's in an ascending order of their x values.

Figure 6A:
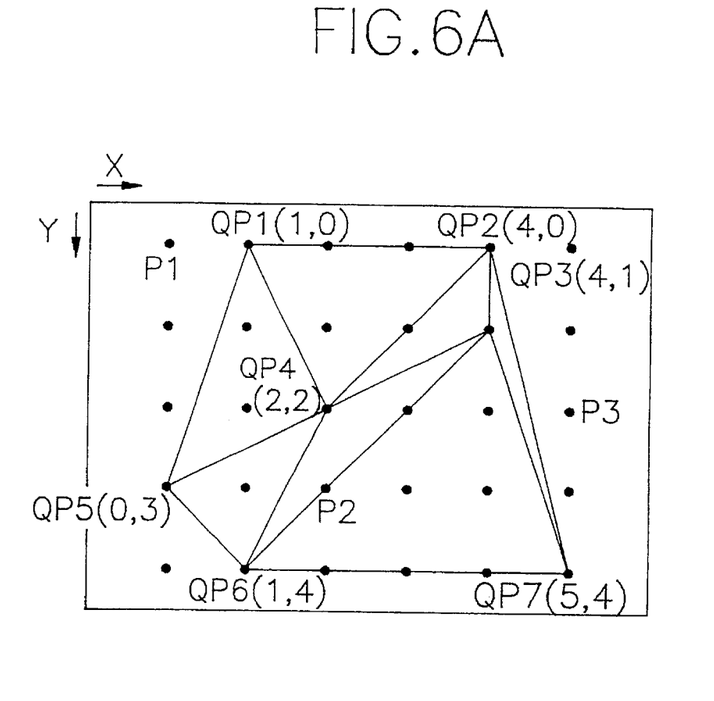
FIGS. 6A and 6B explain the region-based motion estimation method of the present invention.

Specifically, for the set of QP's illustrated in FIG. 6A, a line segment $\overline{QP1QP4}$ is selected for QP1 first, followed by a line segment $\overline{QP2QP3}$ for QP2. $\overline{QP3QP4}$ is determined as a line segment for QP3 because $\overline{QP2QP3}$ has been already selected. The QP of a next priority, i.e., QP4, has two nearest QP's, i.e., QP5 and QP6. In such a case, $\overline{QP4QP5}$ is selected because QP5 has a higher priority. Similarly, line segments $\overline{QP5QP6}$, $\overline{QP6QP4}$ and $\overline{QP7QP3}$ are determined for QP5, QP6 and QP7 in sequence. These processes are repeated until all the line segments are found with the condition that a newly added line segment may not overlap or intersect with any of the previously selected line segments.

Thereafter, prediction of pixels of the current frame is carried out by using an affine transformation technique. As well known in the art, an arbitrary sequence of rotation, translation and scale changes of a moving object can be represented by the affine transformation.

Figure 6B:
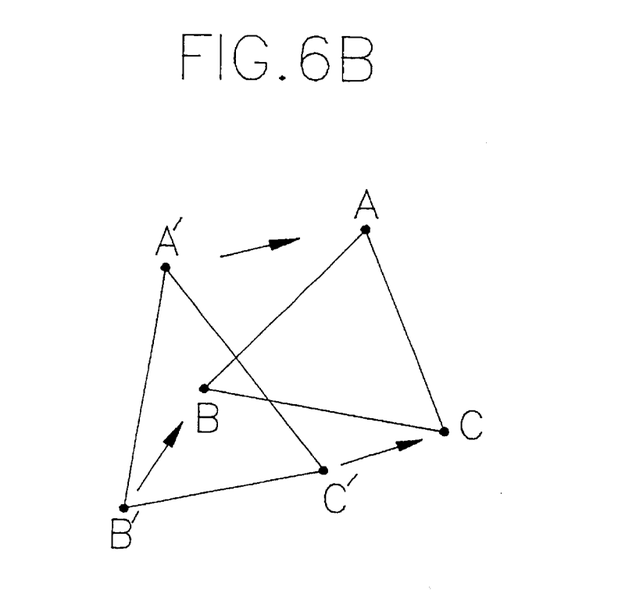

Assuming, as shown in FIG. 6B, that three pixels A, B and C in the current frame are determined as quasi-feature points corresponding to their respective feature points A', B' and C' in the previous frame, pixels in a triangle ABC of the current frame are correlated to those in the triangle A'B'C' of the previous frame by the affine transformation defined as:

$$\begin{bmatrix} x' \\ y' \end{bmatrix} = \begin{bmatrix} a & b \\ c & d \end{bmatrix} \begin{bmatrix} x \\ y \end{bmatrix} + \begin{bmatrix} e \\ f \end{bmatrix} \quad \text{Eq. (1)}$$

wherein (x, y) represents the x and y coordinates of a pixel within the current frame and (x', y'), the coordinates of a predicted position on the previous frame; and a to f are affine transform coefficients.

Those six affine transform coefficients are calculated by solving six linear equations obtained from three sets of related feature and quasi-feature points, i.e., A'–A, B'–B and C'–C. Once the affine transform coefficients are known, each of the remaining pixels in the triangle ABC can be mapped onto a position in the triangle A'B'C' through the use of Eq. 1. In this manner, pixels in each triangle can be predicted from the previous frame. Pixels on the boundary of two contiguous triangles, e.g., P2 shown in FIG. 6A, can be predicted from either one of the two triangles.

Thereafter, a motion vector for each of the pixels, P(x, y), in the current frame is determined from a displacement between the pixel P and its prediction P'(x', y') as:

$$M_x = x^1 - x$$

$$M_y = y^1 - y \quad \text{Eq. (2)}$$

wherein $M_x$ and $M_y$ are the x and y components of the motion vector for the pixel P, respectively.

In the preferred embodiment of the invention, motion vectors for the pixels, e.g., P3 shown in FIG. 6A, lying outside the triangles in the current frame are set to zeros.

Referring back to FIG. 2, provided from the current frame motion vector detection block 214 to the motion compensation block 216 and the image signal encoder 105 shown in FIG. 1 via line L40 are the second set of motion vectors for the pixels of the current frame and the triangle information, respectively, wherein the triangle information represents structural information, e.g., three quasi-feature points forming each of the triangles, of the triangles employed in calculating the second set of motion vectors.

The motion compensation block 216 retrieves each value of the pixels to be contained in a predicted current frame from the second frame memory 124 shown in FIG. 1 by using each of the motion vectors contained in the second set, thereby providing the predicted current frame signal to the subtractor 102 and the adder 115 shown in FIG. 1 via line L30. In case both components of a motion vector, i.e., $M_x$ and $M_y$, are not integers, the predicted pixel value can be obtained by interpolating pixel values of the pixels neighboring the position designated by the motion vector.

In another preferred embodiment of the invention, the predicted positions, which are obtained from Eq. 1, can be directly provided from the current frame motion vector detection block 214 to the motion compensation block 216 in lieu of the second set of motion vectors. Predicted positions for the pixels residing outside the triangles in the current frame are set to have identical positions to those of respective pixels outside the triangles. The motion compensation block 216 then retrieves pixel values, which correspond to the predicted position, from the second frame memory 124, thereby providing the predicted current frame signal onto the line L30.

Referring to FIG. 7, there is provided a detailed block diagram of the image signal encoder 105 shown in FIG. 1. The frame difference signal provided from the subtractor 102 is first stored in a third frame memory 710. In response to the triangle information, an error value calculation block 714 selects difference data from the third frame memory 710, which corresponds to differential pixel values contained in each of the triangles defined at the current frame motion vector detection block 214 shown in FIG. 2, and determines an error value for each of the triangles by averaging the difference data. A storage block 715 stores the triangle information and the error value corresponding to each triangle.

A region selection block 716 selects, as processing regions which will be processed on a region-by-region basis at the quantization block 712, a multiplicity of triangles in a descending order of their magnitude beginning from the maximum error value. The number of selected processing regions is determined based on the buffer occupancy, i.e., the amount of data stored in the buffer 109 shown in FIG. 1 so as to prevent the buffer from overflowing or being underutilized. Thereafter, position information for the multiplicity of selected processing regions is transmitted via line L17 to the image signal decoder 113, the entropy coder 107 shown in FIG. 1 and the third frame memory 710.

In response to the processing region position data, difference data corresponding to each processing region is provided from the third frame memory 710 to the quantization block 712. The quantization block 712 quantizes the difference data to thereby provide the quantized data to a DPCM(differential pulse code modulation) block 713. In the preferred embodiment of the invention, the difference data is quantized on a region-by-region basis by using an identical quantization step size for each processing region. The quantization step size can be adjusted for each region according to the buffer occupancy even though it is not depicted as such in the drawing explicitly. In such case, information on the quantization step size is also transmitted to the buffer for the transmission thereof.

The DPCM block 713 removes or reduces spatial redundancies between the quantized data included in each of the processing regions to provide the DPCM data. In the preferred embodiment of the invention, DPCM is carried out in a raster or spiral fashion as shown in FIGS. 8A and 8B wherein numerals in the FIGS. 8A and 8B indicate a DPCM sequence for the quantized data included in the processing region. The DPCM data is then transmitted to the entropy coder 107 and the image signal decoder 113 shown in FIG. 1 through the line L15.

Figure 9:
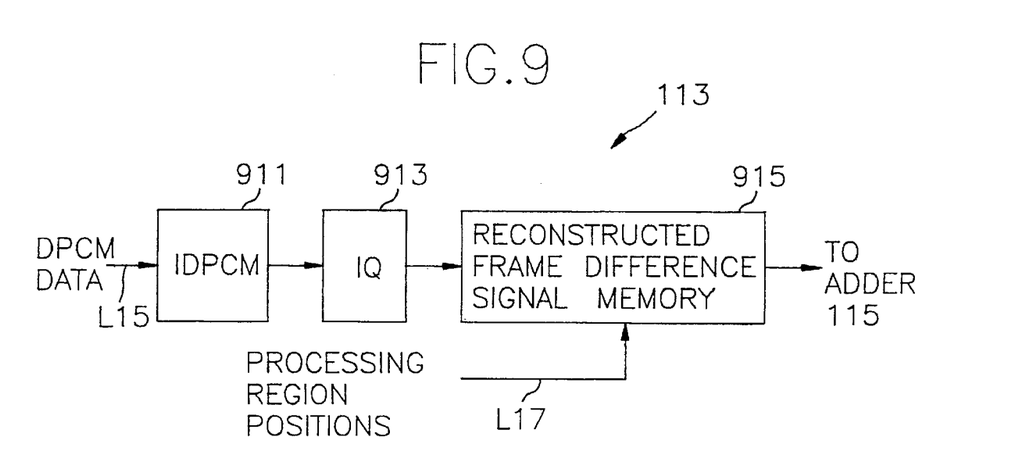
FIG. 9 provides a detailed block diagram of the image signal decoder shown in FIG. 1.

Referring to FIG. 9, there is provided a detailed block diagram of the image signal decoder 113 shown in FIG. 1.

The DPCM data for each of the processing regions is fed to an inverse DPCM(IDPCM) block 911 wherein the DPCM data on the line L15 is converted back into the quantized data. Thereafter, the quantized data is provided to an inverse quantization(IQ) block 913 to provide reconstructed difference data included in the processing region. The reconstructed difference data is fed to a reconstructed frame difference signal memory 915 for their storage therein. A multiplicity of reconstructed difference data for the processing blocks is stored in their corresponding positions based on the processing block positions on the line L17. The remainder of the reconstructed frame difference signal memory 915 is all set to zeros to provide the reconstructed frame difference signal to the adder 115.

Figure 10:
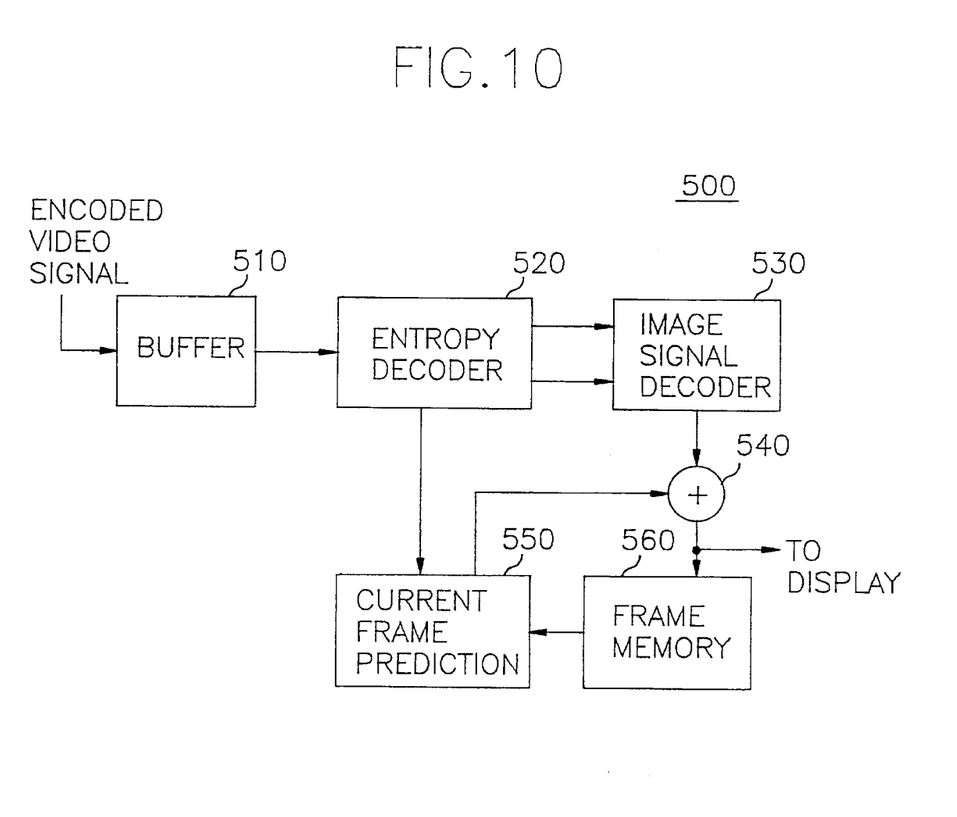
FIG. 10 presents a block diagram of a video signal decoding apparatus in accordance with the present invention.

Referring to FIG. 10, there is illustrated a video signal decoding apparatus 500 corresponding to the video signal encoding apparatus 10 shown in FIG. 1 of the present invention. An encoded video signal transmitted from the video signal encoding apparatus 10 is fed to an entropy decoder 520 through a buffer 510. Then, the entropy decoder 520 decodes the encoded video signal to provide the feature point motion vectors to a current frame prediction block 550; and the DPCM data and the processing region positions to an image signal decoder 530. The image signal decoder 530 performs the same function as the image signal decoder 113 of the video signal encoding apparatus 10, thereby providing an adder 540 with the reconstructed frame difference signal. The current frame prediction block 550 is of a similar structure to that of the current frame prediction block 150 shown in FIG. 2 excepting that there is no motion estimator such as the feature point motion vector detection block 212 shown in FIG. 2, because the feature point motion vectors from the encoder are provided thereto through the entropy decoder 520. The prediction block 550 includes a feature point selection block, a current frame motion vector detection block and a motion compensation block whose functions are the same as those explained with respect to the current frame prediction block 150 above.

Figure 11:
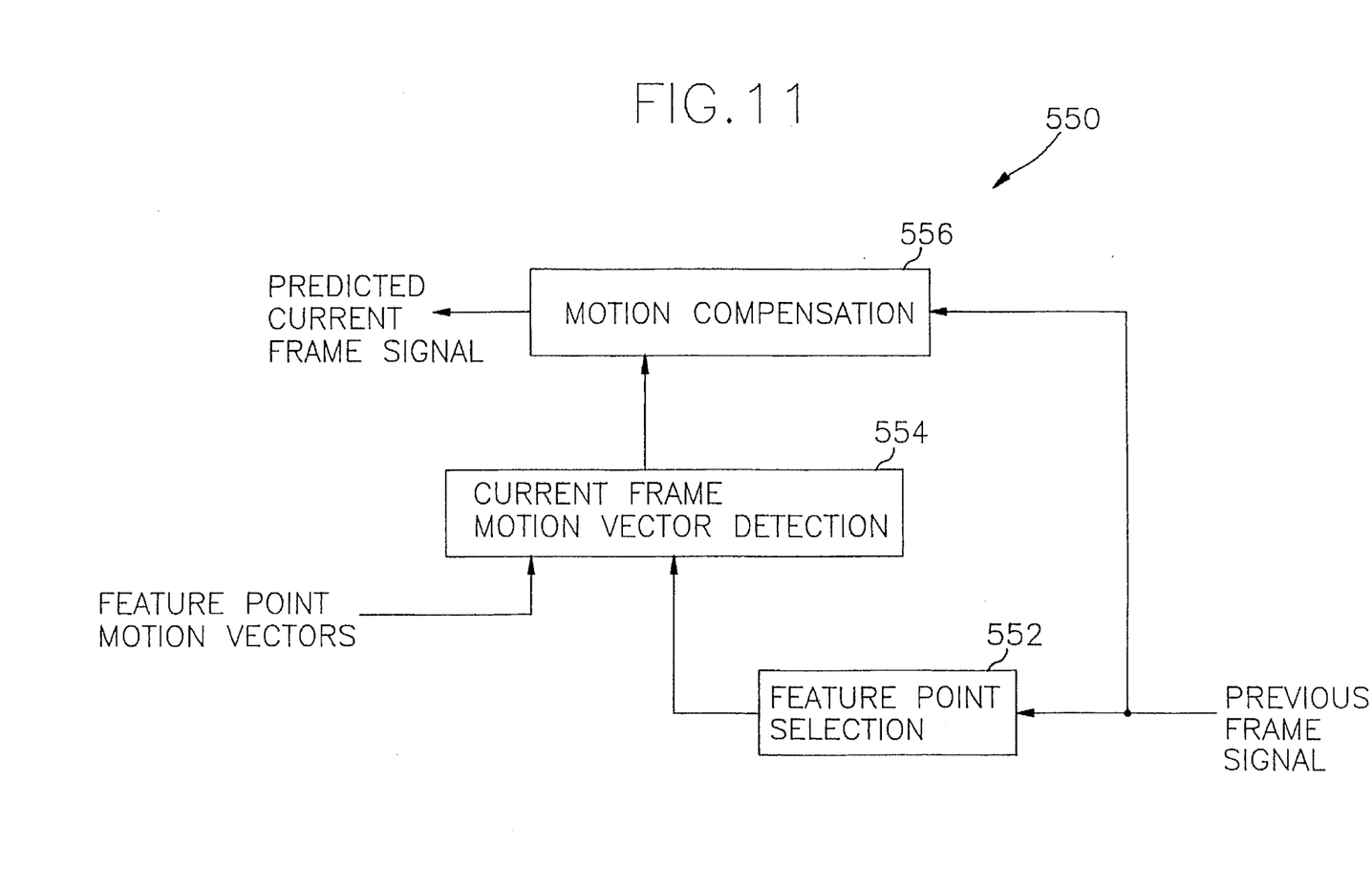
FIG. 11 offers a detailed block diagram of the current frame prediction block shown in FIG. 10.

Specifically, as shown in FIG. 11 which illustrates details of the current frame prediction block 550, a previous frame signal from a frame memory 560 is inputted to the feature point selection block 552 to select a number of feature points, which are identical to those selected at the feature point selection block 210 shown in FIG. 2. In response to the selected feature points from the feature point selection block 552 and the feature point motion vectors from the entropy decoder 520, the current frame motion vector detection block 554 determines the motion vectors for all the pixels contained in the predicted current frame in a same manner as is done at the current frame motion vector detection block 214 of the video signal encoding apparatus 10. The motion compensation block 556 provides the predicted current frame signal which is the same as that from the motion compensation block 216 shown in FIG. 2. As explained with respect to the current frame motion vector detection block 214 of the video signal encoder 10, the current frame motion vector detection block 554 can be made to generate the predicted positions in lieu of the motion vectors.

Referring back to FIG. 10, the predicted current frame signal and the reconstructed frame difference signal from the image signal decoder 530 are added together at the adder 540 to provide the reconstructed current frame signal to a display unit(not shown) and to the frame memory 560.

Using the method and the apparatus explained above, a set of processing regions are selected and processed to provide a low bit-rate video signal codec system. The bite-rate of the encoded signal can be easily altered by changing the number of processing regions in a frame.

While the present invention has been shown and described with reference to the particular embodiments, it will be apparent to those skilled in the art that many changes and modifications may be made without departing from the spirit and scope of the invention as defined in the appended claims.

What is claimed is:

1. A method for reducing a transmission rate of a digital video signal, said digital video signal having a plurality of frames including a current frame and its previous frame, by selectively encoding the current frame, comprising the steps of:

(a) selecting a multiplicity of pixels in the previous frame as feature points and detecting motion vectors for the feature points between the current frame and the previous frame, said feature points representing motions of objects in the digital video signal;

(b) determining a multiplicity of quasi-feature points on the current frame based on the feature points and the motion vectors thereof;

(c) defining non-overlapping polygons formed by line segments connecting the quasi-feature points;

(d) determining a predicted position on the previous frame for each pixel contained in each polygon of the current frame based on positional relationships between the quasi-feature points forming said each polygon and their corresponding feature points;

(e) providing a predicted pixel value for said each pixel based on the predicted position;

(f) generating a differential pixel value for said each pixel by subtracting the predicted pixel value from the pixel value of said each pixel;

(g) calculating an error value for each polygon by averaging the differential pixel values corresponding thereto;

(h) selecting, as processing regions, a multiple number of polygons in a descending order of their magnitude beginning from the maximum error value, and generating position information for the selected processing regions; and (i) encoding the differential pixel values for each of the processing regions.

2. An encoding apparatus, for use in a video signal encoder, for reducing a transmission rate of a digital video signal, said digital video signal having a plurality of frames including a current frame and its previous frame, by selectively encoding the current frame, comprising:

means for storing a reconstructed previous frame of the digital video signal;

means for selecting a multiplicity of pixels in the reconstructed previous frame as feature points and detecting motion vectors for the feature points between the current frame and the reconstructed previous frame, said feature points representing motions of objects in the digital video signal;

means for determining a multiplicity of quasi-feature points on the current frame based on the feature points and the motion vectors thereof;

means for defining non-overlapping polygons formed by line segments connecting the quasi-feature points;

means for determining a predicted position in the reconstructed previous frame for each pixel contained in the current frame based on positional relationships between the quasi-feature points forming each polygon and their corresponding feature points;

means for obtaining a predicted pixel value from the reconstructed previous frame for said each pixel based on the predicted position to thereby provide a predicted current frame signal;

means for generating a differential pixel value for said each pixel by subtracting the predicted pixel value from the pixel value of said each pixel in order to provide a frame difference signal;

means for calculating an error value for each of the polygons by averaging the differential pixel values corresponding thereto;

means for selecting, as processing regions, a multiple number of polygons in a descending order of their magnitude beginning from the maximum error value and generating position information for the selected processing regions;

means for encoding the differential pixel values for each of the processing regions;

means for decoding the encoded differential pixel values to thereby provide reconstructed differential pixel values for each of the processing regions;

means, responsive to the position information, for providing a reconstructed frame difference signal, the reconstructed frame difference signal having the reconstructed differential pixel values for the pixels corresponding to the processing regions and zeros for the pixels outside of the processing regions;

means for providing a reconstructed current frame signal by combining the reconstructed frame difference signal and the predicted current frame signal; and means for statistically coding the encoded differential pixel values.

3. The encoding apparatus according to claim 2, wherein said polygons are triangles.

4. The encoding apparatus according to claim 3, wherein said encoding means includes:

means for quantizing the differential pixel values included in each of the processing regions to thereby provide quantized data for each of the processing regions; and means for coding the quantized data by employing differential pulse code modulation(DPCM) scheme to thereby provide DPCM data.

5. The encoding apparatus according to claim 4, wherein said statistical coding means further includes means for coding the position information for the selected processing regions and the feature point motion vectors.

6. The encoding apparatus according to claim 5, wherein said statistical coding is carried out by using a combination of run length and variable length coding techniques.

7. The encoding apparatus according to claim 4, further comprising a buffer for temporarily storing the statistically coded data for the transmission thereof and providing buffer occupancy which represents the amount of data stored in the buffer.

8. The encoding apparatus according to claim 7, wherein the number of polygons is determined according to the buffer occupancy.

9. The encoding apparatus according to claim 7, wherein quantization of the differential pixel values included in each of the processing regions is carried out by using a quantization step size which is controlled by the buffer occupancy.

10. A decoding apparatus, for use in a video signal decoder, for decoding a transmitted video signal encoded by using an encoding apparatus for reducing a transmission rate of a digital video signal, said digital video signal having a plurality of frames including a current frame and its previous frame, by selectively encoding the current frame, said encoding apparatus including: means for storing a reconstructed previous frame of the digital video signal; means for selecting a multiplicity of pixels in the reconstructed previous frame as feature points and detecting motion vectors for the feature points between the current frame and the reconstructed previous frame, said feature points representing motions of objects in the digital video signal; means for determining a multiplicity of quasi-feature points on the current frame based on the feature points and the motion vectors thereof; means for defining non-overlapping triangles formed by line segments connecting the quasi-feature points; means for determining a predicted position in the reconstructed previous frame for each pixel contained in the current frame based on positional relationships between the quasi-feature points forming each triangle and their corresponding feature points; means for obtaining a predicted pixel value from the reconstructed previous frame for said each pixel based on the predicted position to thereby provide a predicted current frame signal; means for generating a differential pixel value for said each pixel by subtracting the predicted pixel value from the pixel value of said each pixel in order to provide a frame difference signal; means for calculating an error value for each of the triangles by averaging the differential pixel values corresponding thereto; means for selecting, as processing regions, a multiple number of triangles in a descending order of their magnitude beginning from the maximum error value and generating position information for the selected processing regions; means for encoding the differential pixel values for each of the processing regions; means for decoding the encoded differential pixel values to thereby provide reconstructed differential pixel values for each of the processing regions; means, responsive to the position information, for providing a reconstructed frame difference signal, the reconstructed frame difference signal having the reconstructed differential pixel values for the pixels corresponding to the processing regions and zeros for the pixels outside of the processing regions; means for providing a reconstructed current frame signal by combining the reconstructed frame difference signal and the predicted current frame signal; and means for statistically coding the encoded differential pixel values, the position information for the selected processing regions and feature point motion vectors, which comprises:

means for storing the reconstructed previous frame;

means for statistically decoding the transmitted video signal to thereby provide the feature point motion vectors information, the encoded differential pixel values and the position;

means for providing the reconstructed frame difference signal based on the position information and the encoded differential pixel values;

means for providing the predicted current frame signal from the storing means in response to the feature point motion vectors; and means for providing the reconstructed current frame signal by combining the reconstructed frame difference signal an the predicted current frame signal.

* * * * *